United States Patent [19]
Zima, Jr.

[11] 3,744,134
[45] July 10, 1973

[54] METAL TAPE ABUTMENT SLIDE

[76] Inventor: Joseph J. Zima, Jr., 6729 W. 174th Place, Tinley Park, Ill. 60477

[22] Filed: July 20, 1972

[21] Appl. No.: 273,632

[52] U.S. Cl. .................................. 33/138, 33/173
[51] Int. Cl. ............................................ G01b 3/10
[58] Field of Search .................... 33/173, 137, 138, 33/142

[56] References Cited
UNITED STATES PATENTS

| 3,289,305 | 12/1966 | Norton | 33/173 |
| 734,014 | 7/1903 | Traut | 33/143 M |
| 1,115,390 | 10/1914 | Cady | 33/158 |

FOREIGN PATENTS OR APPLICATIONS

| 1,051,680 | 9/1953 | France | 33/137 |
| 63,199 | 4/1949 | Netherlands | 33/42 |

*Primary Examiner*—Harry N. Haroian
*Attorney*—Harvey B. Jacobson

[57] ABSTRACT

A block-like or an equivalent slide is shiftably mounted on the graduated tape of a conventional-type extensible and retractable measuring tape. The slide is provided with an appropriate groove to accommodate the tape. The body portion of the slide has a bendably resilient bottom portion which can be manually squeezed and held by a retaining latch which is readily applicable and releasable and which functions to localize and hold the slide in a set measurement indicating position. One marginal edge of the slide is provided with a limit stop abutment which when brought into contact with a measurable surface serves to ascertain and temporarily mark the distance of a second surface from a first surface. The abutment plate is adjustably mounted and a centralized lower edge portion is provided with a clearance notch for the tape. The over-all device functions for measuring distances between either inside or outside surfaces.

6 Claims, 7 Drawing Figures

PATENTED JUL 10 1973 3,744,134
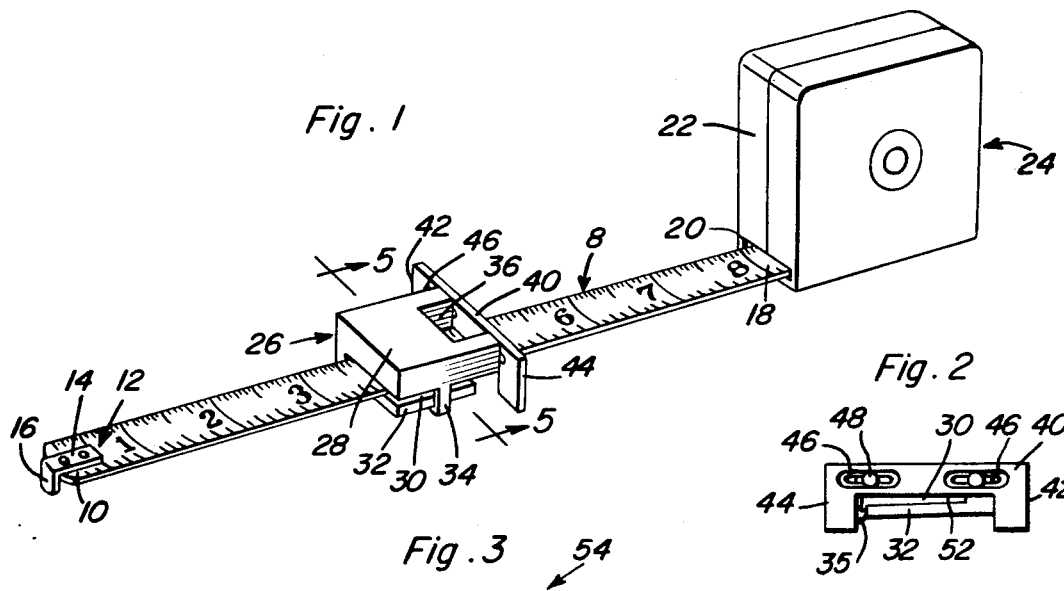
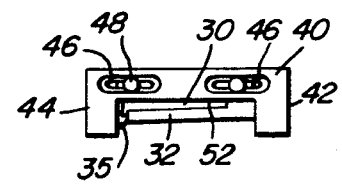
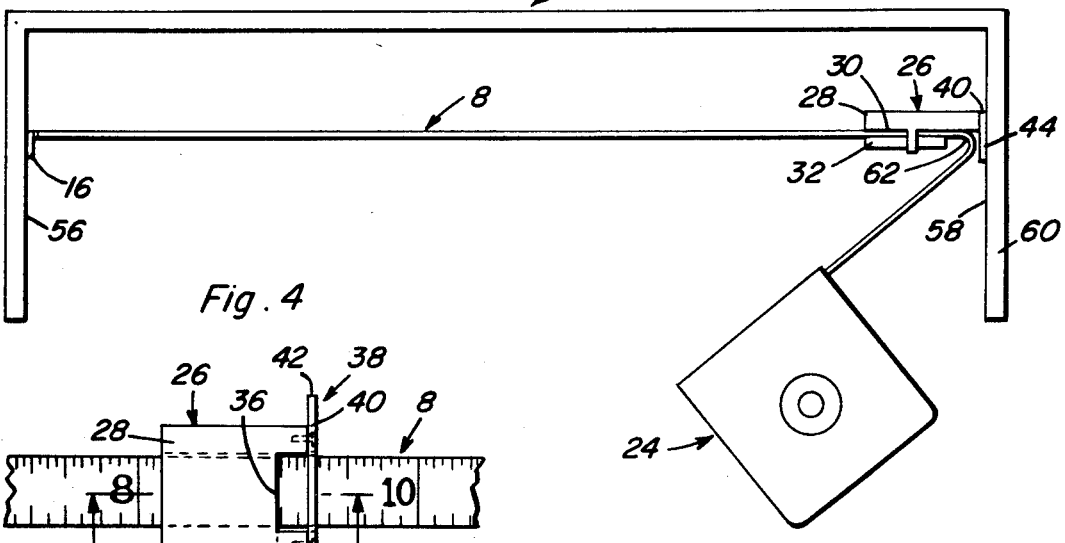
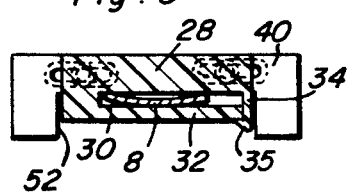
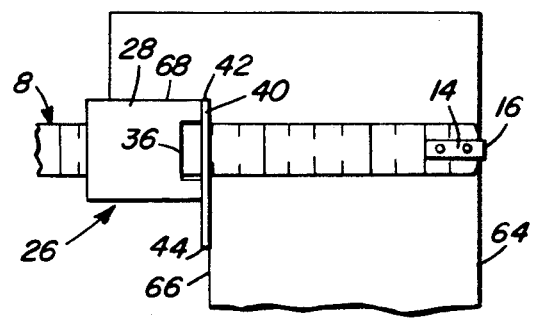
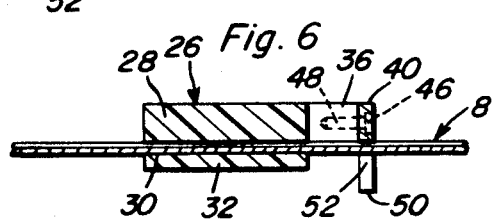

METAL TAPE ABUTMENT SLIDE

The present invention relates to measuring instruments and pertains, more particularly, to an attachment for a commonly used metal measuring tape, the free end of which is provided with a hooked cleat, the other end being coiled on a spool or reel in a housing, the attachment being characterized by a retainable slide, said slide having a leading marginal edge provided with a limit stop and indicating abutment.

By way of introduction and stated somewhat more specifically, the coilable tape has one end which is wound on a spool or drum in a housing and with the other free end being provided with a hooked cleat. Thus, the measuring tape, as such, is of a conventional type. On the other hand the slide and the manner in which it is constructed and used is the featured improvement.

For background information attention is invited to the rafter measuring tape disclosed in U.S. Pat. No. 3,289,305 granted to Claude Norton and which reveals a tape reel enclosed in a case or housing and a specially constructed shiftable and clampable slide. If desired reference may also be made to the patent to Robert B. Bellmer, U.S. Pat. No. 2,591,333 showing a block-type slide. Although less significant reference can also be made to U.S. Pat. No. 928,422, granted to J. W. Beard showing a manually shiftable slotted gauge.

Briefly, the invention is characterized, generally stated, by a reel containing housing, a measuring tape having an extensible and contractable free terminal end provided with a rigid surface contacting cleat, that is, a cleat which is L-shaped and includes a positioning and retaining hook. The other end of the tape is operatively mounted on a reel or a spool contained in the customary rectangular housing. A manually actuatable slide is attached to and shiftably slidable on the tape. Abutment means is mounted on and carried by the slide. The abutment means is designed and adapted to firmly abut either inside or outside measurable surfaces and is registrable with coordinating graduations provided, as usual, on the tape. The slide is provided with a readily applicable and releasable retaining latch which functions not only to localize but to hold the slide in a set measurement taking and indicating position.

An object of the present invention, broadly stated, is to structurally, functionally and in other ways improve upon prior patented sliding gauges and indicators and, in so doing, to provide a construction which is simple, practical, is easy to use in one of many ways and which well serves the purposes for which it has been devised.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in perspective showing a projectable and retractable measuring tape partly extended from the housing or case in which it is contained and showing, what is more significant, the aforementioned manually actuatable measurement taking and indicating slide.

FIG. 2 is a view in elevation of the slide by itself, more particularly, the adjustably mounted abutment.

FIG. 3 is a view in elevation showing how the invention is used for inside measuring purposes and, more particularly, how the abutment resides in contact with the wall and how the housing and tape is moved by hand to an out-of-the-way temporary position.

FIG. 4 is a fragmentary plan view showing a portion of the tape, the slide and how it functions to achieve the desired measuring result.

FIG. 5 is a section taken approximately on the plane of the section line 5—5 of FIG. 1 looking in the direction of the indicating arrows.

FIG. 6 is a detail fragmentary sectional view taken approximately on the plane of the section line 6—6 of FIG. 4 looking in the direction of the indicating arrows.

FIG. 7 is a plan view showing the position of the slide reversed and how the same is used for taking measurements for example in a workpiece having a cut-out corner.

It is understood that the steel or metal measuring tape is of a substantially well known or conventional type and is characterized, generally stated, by the transversely curved metal tape 8, having a free or terminal end portion 10 provided with an L-shaped or equivalent cleat 12, more particularly one which has a leg 14 riveted atop the concave portion of the tape and a laterally bent leg or portion 16 which can be used either as a hook to engage over the work as shown in FIG. 7, or as an abutment for inside measuring purposes as shown in FIG. 3. The other end portion 18 (partly shown) is illustrated as passing through an opening 20 provided therefor in a marginal surface or edge 22 of a reel housing or case 24. It will be seen therefore that the details thus far described are old and well known in the art.

The manually actuatable attachment is set forth primarily as a slide 26 and is characterized as being of block-like construction. The main or body portion is denoted at 28 and has a slot 30 formed therein and defining a relatively thin bendably resilient bottom wall 32 as brought out in the views of the drawing. This slot serves to permit passage of the tape therethrough and the normal inherent tendency of the wall 32 is to spring slightly away from the body portion to provide for sliding of the attachment on the tape. By squeezing the bottom portion 32 toward the body portion the tape is clampingly gripped to hold the slide in a given or set position. For best results a slightly resilient latch 34 is provided and is carried by an edge of the body portion and has a detent 35 which is releasably engageable with the coacting edge as best shown, it would seem, in FIG. 5. It will also be noted that the leading edge portion of the slide or block has a cut-out as at 36 which provides a sight opening and which functions as a window. This window is shown perhaps best in FIG. 4 wherein it exposes certain of the graduations on either one or both of the graduated scales.

Of primary importance is the aforementioned abutment means which is referred to broadly at 38 and which, more specifically, comprises a substantially rectangular plate 40 which is of a length greater than the cross-sectional width of the block-like slide. The respective end portions 42 and 44 project beyond the cooperating edges of the slide. It will be noted however that this abutment plate is provided, as shown in FIG. 2, with paired elongated slots 46 which cooperate with recessed retaining fasteners 48 shown in full lines in FIG. 2 and in phantom lines in FIG. 6. The adjustable mounting of the abutment plate is such that it can be used for inside measurement purposes as illustrated in FIG. 3 or outside measuring purposes as brought out in FIG. 7. When in the latter position the end 42 of the abutment plate can be adjusted so that it is flush with a marginal edge of the slide to achieve the end result desired. It is particularly important to note that the abutment plate is preferably flat-faced and approximately rectangular and is not only of a length greater than the block slide but is of a width that the lower edge portion 50 (FIG. 6) depends below the bottom member of the slide. The central or median portion of this bottom edge portion is provided with a clearance notch 52 which serves to permit guided but free passage of the tape as brought out for example in FIGS. 4 and 6. This notch also permits bending of the tape to readily achieve the inside measuring result shown in FIG. 3.

With reference again to FIG. 3 it will be seen that the structure illustrated is denoted, generally stated, by the numeral 54. The inside surface 56 of one wall is shown disposed in spaced parallelism to the inside surface 58 of a second wall 60. In this arrangement the hook 16 becomes an abutment and is applied to the surface 56. The slide is adjusted to the position shown in FIG. 3 wherein the abutment bears flatwise against the interior surface 58. It will be further noted that the aformentioned housing 24 is positioned at an angle, this being accomplished by bending the tape as at 62. After the distance or dimensional measurement is had the slide is latched in place and stays put in the then localized position. When the overall device is removed (not shown) the tape swings back up into the clearance notch 52 as brought out in FIG. 6 whereupon one can resort to the measuring surface of the abutment plate and can see clearly the desired measuring result. Experience has shown that this latch-equipped attachment or slide achieves the exact measuring results. It can be positioned anywhere along the tape by merely shifting it in an unlatched manner. In fact it can be used forward, backward, right-side up or upside down. Further experience has shown that the invention is helpful to those who find reading a tape measure troublesome and perplexing. It eliminates inaccurate measuring results and minimizes wasted material. Then, too it is beneficial to users with poor eyesight and is excellent as an aid when one is forced to undertake measuring requirements in a poorly lighted area.

The manner in which the device is used in conjunction with the surfaces 64, 66 and 68 is brought out in FIG. 7.

When it is desired to shift the slide the detent 35 on the latch 34 is released and the adjustment can be readily made.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a reel containing housing, a graduated measuring tape having an extensible and retractable free terminal end provided with a rigid surface contacting hook-equipped cleat, the other end of said tape being operatively mounted on a coiling reel wholly and operatively contained in said housing, a manually actuatable slide attached to and shiftably slidable on said tape, abutment means mouted on and carried by said slide, said abutment means being designed and adapted to firmly abut either inside or outside measurable surfaces and being registrable with coordinating graduations on said tape, said slide being provided with readily applicable and releasable retaining means which functions to localize and hold the slide in a set measurement indicating position, said abutment means comprising a flat-faced plate slidingly and adjustably mounted on a predetermined marginal edge portion of said slide.

2. The combination defined in and according to claim 1, and wherein said plate is substantially rectangular in shape and of a length greater than the length dimension of said predetermined marginal edge portion whereby the respective end portions are capable of being adjusted to meet ever varying working needs.

3. The combination defined in and according to claim 2, and wherein said plate has a lower edge, and said lower edge has a median portion which is provided with a constantly open tape accommodating and clearance notch.

4. The combination defined in and according to claim 1, and wherein said retaining means embodies a latch provided with a detent.

5. The combination defined in and according to claim 3 and wherein said slide comprises a block-like body having a leading edge provided with a notch constituting a sight opening, having a slot providing a guide with which said tape is associatively cooperable, having a resilient bottom wall and also embodying a retaining latch which functions to hold said wall in a given operating position.

6. For use on a measuring tape, a slide comprising a block-like body having a leading edge provided with a notch constituting a sight opening, having a slot providing a guide for a tape, having a resilient bottom wall, a retaining latch for holding the wall in a given position, and abutment means carried by said slide, said abutment means comprising an adjustably mounted plate having a bottom edge provided with a centralized clearance notch for a portion of the tape.

* * * * *